US006331592B1

(12) United States Patent
Wong

(10) Patent No.: US 6,331,592 B1
(45) Date of Patent: Dec. 18, 2001

(54) NON-MASSING TOUGHENERS FOR POLYAMIDES

(75) Inventor: Chun Sing Wong, Kingston (CA)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/530,673

(22) PCT Filed: Sep. 17, 1998

(86) PCT No.: PCT/CA98/00875

§ 371 Date: Jun. 21, 2000

§ 102(e) Date: Jun. 21, 2000

(87) PCT Pub. No.: WO99/24483

PCT Pub. Date: May 20, 1999

Related U.S. Application Data

(60) Provisional application No. 60/064,747, filed on Nov. 7, 1997.

(51) Int. Cl.[7] ............................................. C08L 51/06
(52) U.S. Cl. .............................. 525/71; 525/191; 525/66; 525/179
(58) Field of Search ............................... 525/71, 191, 240, 525/66, 179

(56) References Cited

U.S. PATENT DOCUMENTS

| 5,296,552 | 3/1994 | Ohmae et al. | 525/193 |
| 5,451,639 | 9/1995 | Marczinke et al. | 525/193 |
| 6,008,297 | * 12/1999 | Tanaka et al. | 525/178 |
| 6,077,906 | * 6/2000 | Thiruvengada et al. | 525/66 |

FOREIGN PATENT DOCUMENTS

| 196 10 867 A | 9/1997 | (DE) | C08L/77/00 |
| 0 027 375 A | 4/1981 | (EP) | C08F/255/00 |
| 0027375-A2 | * 4/1981 | (EP) | C08F/255/00 |
| 0 742 236 A | 11/1996 | (EP) | C08F/255/02 |
| 0 802 207 A | 10/1997 | (EP) | C08F/255/00 |
| WO 95 16750 A | 6/1995 | (WO) | C08L/77/00 |

OTHER PUBLICATIONS

"Grafted Heterophasic Polymers For The Impact Modification Of Nylon", Research Disclosure No. 358, p. 84, Feb. 1, 1994 (XP000439817).

* cited by examiner

*Primary Examiner*—James J. Seidleck
*Assistant Examiner*—Melanie D. Bagwell

(57) ABSTRACT

The present invention relates to polymeric co-grafting of massing polymers and copolymers of ethylene and one or more α-olefins having at least 4 carbon atoms. The co-grafts are useful tougheners for polyamides.

14 Claims, No Drawings

NON-MASSING TOUGHENERS FOR POLYAMIDES

This application claims the benefit of U.S. Provisional Application No. 60/064,747, filed Nov. 7, 1997.

BACKGROUND OF THE INVENTION

1. Field of the Invention

The present invention relates to novel polymeric compositions produced by co-grafting ungrafted polymeric blends and to toughened polyamide and material containing such tougheners.

2. Description of Related Art

There is considerable prior art concerned with improving the impact strength of polyamides. See for example, British Pat. No. 998,439 or Epstein, U.S. Pat. No. 4,174,358. See also Nylon Plastics, E. I. Kohan (1973, p. 346).

Improvement of impact strength of polyamide resins has long been of interest, for resistance to shattering or brittle breaking on impact of polyamide molded articles is a desirable feature of any molded article. By "ductile" is meant that cracks do not tend to propagate from the area of impact, and thus a resin having good ductility is one that is resistant to crack propagation caused by impact. The ductility of an article can also be measured by notched Izod test ASTM D-256-73.

A variety of additives have been added heretofore to polyamide resins to improve strength and ductility. For example, Epstein U.S. Pat. No. '358 describes improving impact strength and ductility by adding a selected random copolymer which reacts with the polyamide. However, the tendency of polyamides in general to break on impact in a brittle fashion increases as temperatures are lowered. Thus the use of molded articles for low temperature applications, such as winter sports equipment, automobile bumpers, and the like, is decreased.

U.S. Pat. No. 5,346,963 generally discloses the grafting of certain metallocene produced substantially linear ethylene polymers and discloses blends of this grafted material with either grafted or ungrafted thermoplastic polymers including HDPE, LDPE, LLDPE, ULDPE, polypropylene, EPDM and a host of other polymers. There is no teaching, however, of a composition or blend produced from co-grafting a blend of metallocene substantially linear ethylene polymers and either metallocene or non-metallocene produced polymers or copolymers such as polyethylene. Minor levels of polyethylene are sometimes used as excipients or additives in pre-graft polymers.

The present invention is an improvement over the compositions disclosed in the Epstein patent and subsequent nylon toughener patents, in that it has been found that certain polyamides, when toughened with certain compositions as claimed herein which have been prepared from cografting blends of copolymers of ethylene with one or more α-olefins having at least 4 carbon atoms and polymers having a tendency to mass ("massing polymers") such as EPDM or EPR (metallocene or otherwise) or other polymers which mass or agglomerate with grafting agents known in the art yield fabricated parts made from such blends having high impact resistance as well as other beneficial physical properties. Applicants believe the "co-graft" of this blend of ethylene-α-olefin and "massing polymers" is separate and distinct from a simple blend or mixture of grafted ethylene-α-olefin and grafted massing polymers.

In addition, the present inventors have discovered a process which is a significant improvement over the processes for making modified polymeric compositions and nylon toughened materials containing such compositions which relates to elimination of a partitioning agent such as polyethylene dust which has heretofore been necessary to eliminate massing. In particular, carboxylic acid or anhydride modified EPDM and EPR are commonly used as tougheners for polyamide. However due to the tacky nature of non-metallocene EPDM and EPR or any metallocene or non-metallocene polymer which has amorphous or tacky properties, pellets of these unmodified or acid or anhydride modified polymers are generally coated with a small amount (up to 10 wt %) of a partitioning agent, such as talc, carbon black or PE dust to make them free flowing. The addition of the partition agent is generally a costly and cumbersome step. This means an extra step in the modification process. Extra equipment is required to introduce the partitioning agent. Further, the quality of the modified polymer may suffer due to either too much or too little of the partitioning agent. Too little partitioning agent may result in massing of the product creating handling difficulties in the nylon compounding step. Too much powder may have a detrimental effect on the performance of the product as toughener for nylon. Even if applied in the appropriate amount, the partitioning agent may segregate during shipping, rendering it ineffective.

Thus, the present inventors have found a way of eliminating the need to add a partitioning agent to either pre-modified or modified EPDM or EPR or other modified massing polymer in the modification process while surprisingly retaining the excellent performance of the product as toughener for polyamide.

As discussed above, the use of modified EPDM or EPR as the toughening agent for polyamide is well known, see for example, Epstein (U.S. Pat. No. 4,174,358, Nov. 13, 1979). This and subsequent art which uses EPDM or EPR is characterized by the need to use a partitioning agent or to select an EPDM or EPR with increased crystallinity which does not have a tendency to mass.

By using a blend of a copolymer of ethylene and one or more α-olefins having at least 4 carbon atoms and an ethylene copolymer having a tendency to mass as a substrate in the inventors' improved process, it was found that a non-massing functional polymer is obtained. By suitably choosing the concentration of the copolymer of ethylene and one or more α-olefins having at least 4 carbon atoms, the density of this component and the graft level of the resulting polymer blend as described herein, the product can be used as a toughener for polyamide.

BRIEF SUMMARY OF THE INVENTION

The present invention relates to a composition which comprises or consists essentially of a carboxylic acid or anhydride modified mixture of any metallocene or conventional ethylene copolymer having a tendency to mass ("massing polymer"), and a copolymer of ethylene and one or more α-olefins having at least 4 carbon atoms (4–10C) ("Composition A") wherein the composition is produced by modifying (co-grafting) a blend of such "massing polymer" and ethylene-α-olefin copolymer. The ratio of ethylene α-olefin to the "massing polymer" such as EPDM or EPR may be from about 10:90 to about 90:10.

Surprisingly and unexpectedly, the pre-modified blend which is then subsequently modified with a typical modifier such as maleic anhydride to typical levels or more (e.g., 0.3 to 2% by weight) provides good toughening properties and non-massing properties or non-massing characteristics without loss of low temperature toughness. The properties will vary depending upon the particular pre-grafted polymers. In particular, the use of the ethylene α-olefin in the pre-grafted blend eliminates the need for either a pre-modification or post-modification partitioning agent.

The present invention more particularly relates to a composition comprising a copolymer of ethylene and one or more α-olefins having at least 4 carbon atoms wherein the copolymer has a density range of 0.930–0.880 and a Melt Index (MI) of 0.01–50 and a metallocene or non-metallocene produced plastomer having a tendency to mass with, in the case of a conventional (non-metallocene) polymer, has a density of ≦0.88 and, in the case of a metallocene, has a density of ≦0.88 which is co-grafted to form the composition of the invention. This composition is then utilized as a component for blending with olefinic or non-olefinic materials ad defined in U.S. Pat. No. 5,346,963, which is hereby incorporated by reference. The blended composition is then utilized for a number of purposes including, for example, toughening polyamide (Nylon 6 or Nylon 6,6 or the like) but it may also be utilized in other compositions or blends or materials. The mixture in the preferred case is useful as a toughener for polyamide compositions.

The toughened polyamide composition generally comprises, (a) polyamide; (b) composition (A) and optionally, (c) toughening acceptable excipients which are selected from additives such as stabilizers and inhibitors of oxidative, thermal and ultraviolet light degradation; lubricants and mold release agents; colorants including dyes and pigments, fibrous and particulate fillers and reinforcement, nucleating agents, plasticizers, etc. Composition (A) is useful as a toughener for polyamide or as an additive to form blends with elastomeric or thermoplastic olefinic or non-olefinic polymers. Representative of the non-olefin polymers include, for example, polymers such as polyesters, polyamides, polycarbonates, polyvinyl chloride, epoxies, polyurethanes and the like. The compositions containing composition (A) and the thermoplastic olefinic or non-olefinic polymers are useful in a wide range of end-use or intermediate use applications including packaging, industrial applications and the like. For molded articles, like engineered materials, composition (A) is preferably blended with polyamides.

In one embodiment, the manufacturing process to make (A) is superior over the existing process of modifying massing polymers such as EPDM or EPR because no dusting of the product is required. Thus the need to use extraneous and costly partition agent in the product is eliminated, resulting in a better quality and more consistent product.

The present invention is also preferably a thermoplastic composition comprising or consisting essentially of a semi-crystalline polyamide matrix resin such as Nylon 6,6 or Nylon 6 and copolymer, particles of Composition A dispersed in the polyamide matrix resin. The polyamide may be present in the composition in an amount, for example, of about 75% to 85% by weight of the composition in the preferred case. Of course, these percentages can vary from 3% Composition A and 97% polyamide to 40% Composition A and 60% polyamide. The copolymeric blend has particles that are dispersed substantially uniformly throughout the polyamide. Amorphous polyamide may also be used.

The copolymeric materials have a melt flow index of between about 0.01 to 50 dg/min at 190° C., 2.16 Kg weight. The composition of the copolymeric blend comprises either (a) 10–90% by weight ethylene-α-olefin having at least 4 carbon atoms (e.g., polyethylene), (b) 90–10% by weight of a massing polymer, wherein both (a) and (b) are grafted with an olefinic carboxylic acid or anhydride or other grafting reagents known to those of skill in the art in an amount of 0.05 to 5 wt %, preferably 0.1 to 3 wt % and most preferably 0.3 to 2 wt % of the copolymeric blend. These co-grafted blends are then combined with the polyamide(s) and other excipients to form a toughened composition. The copolymeric materials are present in the toughened composition in an amount of at least 1% by weight of the composition. The copolymeric materials in some of the compositions of the invention are present in amounts such that their weight plus the weight of the polyamide polymer combine to make 100% of the thermoplastic components of the compositions of the invention. The compositions of the invention may contain various fillers, reinforcing ingredients such as glass fibers, pigments, stabilizers, mold release agents, antistatic agents and the like all of which are known to those skilled in the art.

The present invention also relates to a process for manufacturing a toughened composition, comprising:

(a) preparing an olefinic carboxylic acid or anhydride modified copolymer of ethylene and one or more α-olefins having at least 4 carbon atoms/massing polymer blend to form a non-massing co-graft; and (b) combining the non-massing co-graft produced in step (a) with (1) a polyamide material to form, under suitable reaction conditions, a toughened composition or (2) another olefinic or non-olefinic material to form a formulation containing the non-massing co-graft.

The process more particularly comprises, (a) preparing a modified co-graft of a blend of a copolymer of ethylene and one or more α-olefins having at least 4 carbon atoms and a massing polymer by (1) feeding both the massing polymer and the ethylene-α-olefin at a ratio of 10–90% ethylene-α-olefin to massing polymer into the feed throat of a 40 mm Berstorff co-rotating twin screw extruder or similar device with a barrel temperature of between 150 and 400° C. (preferably 220–350° C.);

(2) optionally introducing a free radical initiator such as peroxide [0–5000 ppm] as a master batch and introduction of an olefinic carboxylic acid or anhydride or derivative thereof in liquid form into the extruder, to form the co-grafted polymeric blend;

(3) removing excess unreacted olefinic carboxylic acid or anhydride and isolating the polymeric co-graft; and (b) melt-blending the polymeric co-graft produced in step (a) with polyamide and an optional ungrafted elastomer or polyethylene in an extruder, internal mixer or rubber mill at a temperature sufficient to melt the blend to form the toughened composition.

The process further relates to forming the toughened composition into an injected molded material or fabricated part.

DETAILED DESCRIPTION OF THE INVENTION

As summarized above, the present invention relates to a polymeric co-graft having equal or improved physical properties relative to currently available polyamide tougheners which also provides equal or improved physical properties to the final toughened compositions. In addition, the inventors have discovered an improved process for eliminating the dusting requirement and use of a partitioning agent in the manufacturer of acid or anhydride modified EPRs or EPDMs which are normally susceptible to massing.

The thermoplastic polyamides used in the composition may be obtained from at least one aromatic dicarboxylic acid containing 8–18 carbon atoms and at least one diamine selected from the class consisting of (i) 1–12 carbon normal aliphatic straight-chained diamine, and (ii) 8–20 carbon cycloaliphatic diamines containing at least one cycloaliphatic ring. Diacids can be isophthalic and terephthalic acids.

Preferred diamines are hexamethylenediamine. The polyamides useful in this invention include nylon 6,6 or nylon 6.

Processes for the preparation of toughened nylon blends are known in the art. A suitable process is disclosed, for example, in Caywood, U.S. Pat. No. 3,884,882. The compositions of this invention may be prepared by mixing preweighed, blended quantities of the polyamides and the co-grafted polymers in the molten state under high shear along with optional ungrafted elastomers or polyethylenes. Such mixing can be accomplished in commercially available equipment such as a 53 mm twin-screw extruder manufactured by Werner & Pfleiderer Corporation. A satisfactory screw design for an 1860 mm long screw includes mixing elements 750 mm and 1390 mm from the feed end of the screw. Barrel heaters may be set at 260–275° C. A vacuum port may be used near the die. Screw speeds of 200–250 rpm and extrusion rates of 120–230 pph afford the compositions of this invention. The strands are quenched in water and pelletized. The pellets are dried to a moisture content of 0.3% by weight or less prior to final processing (e.g., injection molding, blow molding, extrusion). The concentrations for the ingredients in toughened polyamides are at least 3 weight % co-graft and 97–60 weight % polyamide. Especially preferred concentrations of the ingredients in the toughened products are 15–25 wt % co-graft (toughener) and 85–75 wt % polyamide.

By "massing" is meant that the pre-modified or modified polymer absent a sufficient amount of ethylene-α-olefin having at least 4 carbon atoms (including polyethylene(s)) has a tendency to mass together or agglomerate at a pressure of 100 g/sq. cm at 50° C. for a 24 hour period. The samples are physically inspected for massing characteristics and are also evaluated in dry-flow experiments. In a dry-flow experiment, 250 grams of a resin is allowed to pass through a stemmed plastic funnel (2 cm in diameter at stem) and the time to pass through the stem is recorded. Relative dry-flow is a good indication of how easily the resin can be handled.

The composition of the invention may be fabricated into high impact parts such as automobile body parts, for example bumpers, fender extensions and the like by injection molding, blow molding, extrusion and other similar techniques. Yield strength and elongation at break may be determined according to ASTM D-638. Flexural modulus may be determined (¼-inch specimens) according to ASTM D-790. Notched Izod impact (½×2.5×⅛ inch specimens) may be determined according to ASTM D-256-73. The type of specimen break may be noted as follows and conforms to definitions in ASTM D-256-73, namely:

C=complete break-wherein the specimen separates into two or more pieces

H=hinge break-an incomplete break such that one part of the specimen cannot support itself above the horizontal when the other part is held vertically P=partial break-an incomplete break that is not a hinge break but has fractured at least 90 percent of the distance between the vertex of the notch and the opposite side N=non-break-an incomplete break where the fracture extends less than 90 percent of the distance between the vertex of the notch and the opposite side M=mixed breaks-some of the samples have complete breaks and some of the samples have partial breaks.

Notched Izod impact values may be plotted versus temperature. The ductile/brittle transition temperature is defined as that temperature at which half the specimens break by ductile failure and half break completely. The ductile/brittle transition temperature occurs at the point of steepest slope on the plot of notched Izod impact value versus temperature.

The nylons containing tougheners may be tested dry-as-molded. The nylons containing tougheners may be conditioned in an accelerated procedure to a moisture content equivalent to 50% RH by first immersing them in demineralized water at 50° C. and then storing them in air at 23° C. and 50% relative humidity until the weight gain matched that attained by long term equilibrium exposure of such samples to air at 23° C. and 50% relative humidity.

Improvement of impact strength of polyamide resins has long been of interest, for resistance to shattering or brittle breaking on impact of polyamide molded articles is a desirable feature of any molded article. Tendency to break on impact in a brittle fashion (rather than ductile fashion), is a significant limitation on the usefulness of such articles. By "ductile" is meant that cracks do not tend to propagate from the area of impact, and thus a resin having good ductility is one that is resistant to crack propagation caused by impact. The ductility of an article can be measured by notched Izod test ASTM D-256-73. By "elastomeric" is meant that the copolymer after molding will assume substantially its original shape after distortion causing pressure is removed. By "olefinic" is meant terminally unsaturated monomers including dienes and the like. By "copolymer" is meant a polymer composed of two or more different monomeric units. EPDM used in the tables and examples stands for a copolymer composed of 72 percent ethylene, 24 percent propylene, and 4 percent 1,4-hexadiene. It is employed as an extender for the toughening polymer.

The present invention is alternatively directed to a polymeric co-graft composition, comprising (a) an elastomer having a density of less than 0.88 wherein the elastomer has a tendency to mass; and (b) an olefinic polymer having a density range of 0.88 to 0.93 wherein (a) and (b) are co-grafted with a grafting monomer selected from an olefinic carboxylic acid or anhydride at a percentage-by-weight of 0.05 to 5%.

Grafting or modification of EPDM or other elastomer subject to massing or characterized as having massing tendencies along with PE results in an adduct blend having 0.05 to 5%, preferably 0.1–3% and most preferably from 0.3–2% functionality, acid or anhydride or both, as can be measured by Infrared (CPE 671 Spectrophotometer), and 0.05–5 dg/min melt flow at 190° C. through a 0.0825" in diameter orifice under a weight of 2.16 Kg. Preferably, the melt flow is 0.1–10 dg/min, most preferably 0.5–5 dg/min.

The present invention more particularly comprises a thermoplastic polyamide blend comprising:

(a) 60–97% by weight of a polyamide;

(b) 3–40% by weight of a polymeric, toughening agent co-graft composition that is prepared from a blend of a massing polymer and a polyethylene.

The thermoplastic polyamide may be selected from Nylon 6,6 or nylon 6 or blends thereof. Nylon 6,6 is polyhexamethyleneadipamide, while nylon 6 is polycaprolactam. Both are high molecular weight polymers, i.e., of film-forming molecular weight. The invention further comprises (a) 60–97% by weight of a olefinic or non-olefinic material; and (b) 3–40% by weight of a polymeric co-graft (Composition A) that is prepared from a blend of a massing polymer and a polyethylene.

The carboxyl or carboxylate functionality is ordinarily supplied by employing as grafting reagent an ethylenically unsaturated compound containing carboxyl or carboxylate groups. The carboxyl or carboxylate functionality can be supplied by reacting the massing polymer and polyethylene blend with an unsaturated compound taken from the class consisting of alpha, beta-ethylenically unsaturated dicarboxylic acids having from 4 to 8 carbon atoms, or derivatives thereof. Such derivatives include monoesters of alcohols of 1 to 29 carbon atoms, anhydrides of the dicarboxylic acids, or the metal salts of the acids, or the monoester of the dicarboxylic acid having from 0 to 100 percent of the carboxylic acid groups ionized by neutralization with metal basic salt, and the like. Illustrative of such acids and derivatives are maleic acid, maleic anhydride, maleic acid monoethyl ester, metal salts of maleic acid monoethyl ester, fumaric acid, fumaric acid monoethyl ester, itaconic acid, vinyl benzoic acid, vinyl phthalic acid, metal salts of fumaric acid monoethyl ester, monoesters of maleic or furmaric acid or itaconic acids where the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. The adducts can be prepared by any grafting process which intimately mixes the unsaturated acid or derivatives with the polymeric blend (such as EPDM or EPR and PE) without appreciable generation of free radicals, and which concurrently or subsequently heats the mixture to a temperature where thermal addition occurs. Selected temperatures will generally be at least 225° C. to obtain adduct formation at acceptable rates and less than about 450° C. to avoid any excessive polymer breakdown.

Preferred temperature ranges will vary with the particular polymer and can readily be determined by one skilled in the art. Mixing of the acid or derivative and polymer can be by blending in an internal mixer or extruder, or by blending finely divided dry compound with polymer on a well-ventilated rubber mill with concurrent or subsequent heating, such as in a hot press or mold. The acid or derivative can be substituted with groups, such as bromine or chlorine, which do not unduly interfere with the graft reaction.

It is generally desired to form adducts containing about 0.05 to 5 percent, and preferably about 0.1 to 3 percent, by weight of the grafting monomer incorporated.

Representative massing polymers include those metallocene or non-metallocene ethylene propylene diene rubbers and ethylene propylene rubbers or polymers selected from copolymers of ethylene and α-olefins with at least 3 carbon atoms which have a density of less than 0.88 g/cc or as described in the examples. Metallocene substantially linear ethylene copolymers described in U.S. Pat. No. 5,346,963 are specifically incorporated herein provided that such polymers have the requisite density and/or massing tendencies either before grafting or post-grafting with olefinic carboxylic acid or anhydride compounds. This specifically includes substantially linear ethylene-octene copolymers having a melt flow ratio of $I_{10}/I_2$ of equal or greater than 6.13 and a $M_w/M_n$ ratio of equal or less than the melt-flow ratio less 4.63. Such metallocene polymers are commercially available and sold by DuPont-Dow under the trademark ENGAGE®. Other suitable massing polymers include those metallocene polymers having the requisite density and/or massing characteristics but with a melt-flow ratio $I_{10}/I_2$ of less than 6.53 and an $M_w/M_n$ ratio of greater than the melt flow ratio less 4.63. Such polymers are commercially available under the trademark EXACT® by Exxon.

The polyethylenes suitable for the pregrafted blend with the massing polymer are selected from copolymers of ethylene with one or more α-olefins having at least 4 carbon atoms, e.g., ethylene butene-1 copolymer, ethylene-hexene-1 copolymers, ethylene-octene-1 copolymers, ethylene-butene-octene terpolymer where its density lies between 0.880 to 0.930 g/cc, preferably 0.890 to 0.920 g/cc, and most preferably, 0.900 to 0.910 g/cc. The preferred melt index (MI) is (at 190° C., 2.16 Kg) is between 0.01 to 50 dg/min, more preferred is between 0.1 to 10 dg/min, and most preferred 0.5 to 5 dg/min. The polyethylene can be made using conventional Zeigler Natta catalyst or using known metallocene catalysts.

The toughening material blends of the present invention are prepared by admixing the ingredients in the indicated proportions and melt blending them for intimate admixture. Preferably, the nylon 6, nylon 6,6 and toughening polymer or polymers are first mixed by tumbling in a drum. The melt blending typically can be conducted at a temperature above the melting point of the components and below the decomposition temperature. A temperature range of about from 260° C. to 330° C. is preferred.

The toughening blends are particularly useful in applications in which impact strength is important at low temperatures, such as in automobile bumpers, sports equipment, safety equipment and the like. The blends of this invention may also contain one or more conventional additives such as stabilizers and inhibitors of oxidative, thermal, and ultraviolet light degradation, lubricants and mold release agents, colorants including dyes and pigments, flame-retardants, fibrous and particulate fillers and reinforcements, plasticizers, and the like. These additives are commonly added during the mixing step.

Representative oxidative and thermal stabilizers which may be present in blends of the present invention include Group I metal halides, e.g., sodium, potassium, lithium with cuprous halides, e.g., chloride, bromide, iodide; hindered phenols, hydroquinones, and varieties of substituted members of those groups and combinations thereof. Representative ultraviolet light stabilizers, include various substituted resorcinols, salicylates, benzotriazoles, benzophenones, and the like.

Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like.

Representative fillers include carbon fibers, glass fibers, amorphous silica, asbestos, calcium silicate, aluminum silicate, magnesium carbonate, kaolin, chalk, powdered quartz, mica, feldspar, and the like.

Representative flame-retardants include organic halogenated compounds such as decabromodiphenyl ether and the like. Aluminum distearates may also be added.

As discussed above, the toughening composition consists essentially of a co-grafted blend of polyethylene and any known massing polymers which exhibit massing problems. Surprisingly, the inventors have discovered that addition of a sufficient quantity of PE in the density range of 0.880–0.930 g/cc to ungrafted or unmodified rubbers such as EPDM or EPR or those metallocene polymers which are susceptible to massing followed by grafting using typical grafting agents selected from, for example, maleic acid or anhydride, eliminates the requirement of dusting materials (partitioning reagents) which heretofore were required for these materials without diminishing their toughening properties in polyamide blends containing said composition.

Variables that an artisan will recognize include relative PE concentration ranges; density ranges of the PE and the graft level (%) ranges of the blend. The PE concentration (weight percentage relative to the EPDM or other polymer) should be sufficient to provide non-massing characteristics to the blend while still permitting sufficient EPDM and thus grafted EPDM to provide toughening properties to the polyamide or material requiring toughening. A suitable weight percentage of PE is greater than 10% and less than 90% wherein this blend (PE/EPDM or PE/EPR), upon grafting with a suitable grafting agent, has non-massing characteristics and toughening characteristics.

The compositions of the invention farther comprise or consist essentially of a graft modified polymeric blend made from (a) PE in a weight percentage ratio relative to (a)+(b)+(c) of greater than 10%; (b) EPDM or other polymer which is susceptible to massing and (c) a grafting agent. The density ranges and graft level ranges of the PE and the PE/pre-grafted toughener varies with known PE densities and known toughener grafting percentages wherein said densities and grafting levels provide sufficient toughening properties and do not disrupt the non-massing influence of the PE.

For performance as a toughener, the following variables should be manipulated:

| Variable | preferred trend |
| --- | --- |
| PE concentration | low |
| PE density | low |
| graft level | high |

For selection of non-massing characteristics, the following variables should be manipulated:

| | |
| --- | --- |
| PE concentration | high |
| PE density | high |
| graft level | no effect |

Without being bound by theory, it is also possible that the ability of the PE to make the EPR or massing polymer non-massing depends on the crystallinity of the EPR or massing polymer. The present invention in one aspect preferably relates to a method of improving the massing characteristics of semi-crystalline massing polymers comprising adding a non-massing effective amount of polyethylene to said elastomer followed by co-grafting.

The polyamide matrix resin of the toughened compositions of this invention is well known in the art and embraces those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-amino-undecanoic acid, bis (paraaminocyclohexyl) methane dodecanoamide.

It is also possible to use in this invention polyamides prepared by the copolymerization of two of the above polymers or terpolymerization of the above polymers or their components, e.g., for example, an adipic, isophthalic acid hexamethylene diamine copolymer. Preferably the polyamides are linear with a melting point in excess of 200° C. As great as 97 percent by weight of the composition can be composed of polyamide; however, preferred compositions contain from 60 to 85 percent, and more narrowly 75 to 85 percent, by weight of polyamide.

The toughened composition or pre-fabricated material is toughened or strengthend by the combination of at least one polymer and PE which is ultimately grafted with the above grafting agent and further added to polyamide or other material. The term "at least one polymer" means one or more polymers which coexist in single discrete particles having a particle size ranging from 0.01 to 3 microns, preferably 0.02 to 1 micron, within the matrix, so that either the mixture of polymers or at least one of the polymers in the mixture meets the following criteria.

(a) sites which adhere to the polyamide matrix;
(b) tensile modulus, as added in the range of about 1.0 to 20,000 psi., preferably about 5 to 20,000 psi., the ratio of tensile modulus of the polyamide matrix resin to tensile modulus of said at least one polymer being greater than 10 to 1, preferably greater than 20 to 1.

The polyamide is the continuous phase in the composition and the polymer performs the function of a soft dispersed phase which is adhered to the polyamide matrix.

The melt flow of the co-grafted composition is in the range of 0.05–50 dg/min by ASTM D-1238 at 190° C. though a 0.0825" diameter orifice and 2160 g. load, preferably 0.1 to 10 dg/min and most preferably 0.5–5 dg/min. Since the viscosity is highly shear sensitive the compositions of the invention are well suited for extrusion applications.

It is apparent from the above description that a variety of co-grafted polymeric blends are effective in toughening polyamides or in improving properties of other olefinic or non-olefinic materials and a substantially large number of combinations are useful. It is therefore not surprising that the limits of effectiveness of some components of the compositions depend on the other components. For example, the lower limit of concentration of an effective adhering site, e.g., maleic anhydride, will probably be lower than a less effective adhering site, e.g., methacrylic acid. Similarly the balance between amine and carboxyl end groups in a matrix will influence the comparative effectiveness of different adherent sites of the at least one polymer. Polymers or polymeric mixtures in the lower modulus range tend to be more effective than those polymers or polymeric mixtures in the higher modulus range and may be useful at lower concentrations of adherent site. However, more than one such polymeric mixture can be present in the toughened thermoplastic composition.

Stabilizers can be incorporated into the composition at any stage in the preparation of the thermoplastic composition. Preferably the stabilizers are included early to preclude the initiation of degradation before the composition can be protected. Such stabilizers must be compatible with the composition. The oxidative and thermal stabilizers useful in the materials of the present invention include those used in addition polymers generally. They include, for example, up to 1 percent by weight, based on the weight of polyamide of Group I metal halides, e.g., sodium, potassium, lithium with cuprous halides, e.g., chloride, bromide, iodide, hindered phenols, hydroquinones, and varieties of substituted members of those groups and combinations thereof.

The ultraviolet light stabilizers, e.g., up to 2.0 percent, based on the weight of polyamide, can also be those used in addition polymers generally. Examples of ultraviolet light stabilizers include various substituted resorcinols, salicylates, benzotriazoles, benzophenones, and the like. Abbreviations for some of the terms specified herein include:

PE-polyethylene
EPR-ethylene/propylene rubber
EPDM-ethylene/propylene/diene rubber
mPE-metallocene catalyzed polyethylene.

The following examples describe the various co-grafted blends and compositions which were made according to the invention and further show the physical properties associated with each composition that relate to advantageous performance. They are to be construed as non-limiting. In addition to the compositions described herein, the present invention relates to a process for the preparation of a toughened multi-phase thermoplastic composition which comprises, in a closed system, (a) admixing (1) 60 to 97 percent by weight of a polyamide matrix resin of number average molecular weight of at least 5000, and (2) 3 to 40 percent by weight of at least one co-grafted polymeric blend at a temperature in the range of about 5° to 100° C. above the melting point of said polyamide matrix resin and (b) shearing to disperse the polymer in said matrix.

EXAMPLES

The examples in Tables 1 and 2 were made by feeding both the massing polymer (EPDM) and PE together at the indicated ratios into the feed throat of a 40 mm Berstorff co-rotating twin screw extruder with the barrel temperature set at 280° C. Peroxide (300 ppm) was then introduced in the form of a master batch and the maleic anhydride (1–2% by weight relative to total polymer feed) is added as a liquid and injected into the extruder through an injection port. After the reaction, the unreacted grafting monomer is removed by applying vacuum at a vent port. The resulting product was pelletized by using a Gala under water pelletizer and collected into bags.

The following Table shows the improvement of non-massing characteristics with the incorporation of PE in feed:

TABLE 1

| Co-graft Example | Composition EPR % | PE type | PE % | MI (190 C.) dg/min. | MA % | Dry flow sec | Massing 50 C., 24 hr. |
|---|---|---|---|---|---|---|---|
| 1 | 78 | PE 1 | 22 | 4.6 | 0.92 | 36 | none |
| 2 | 76 | PE 1 | 24 | 3 | 1.2 | 22 | none |
| 3 | 47.5 | PE 1 | 52.5 | 0.95 | 1 | 5.7 | none |
| 4 | 47.5 | PE 1 | 52.5 | 1.7 | 0.89 | 5.8 | none |
| 5 | 19 | PE 1 | 81 | 0.9 | 0.82 | 5.5 | none |
| 6 | 19 | PE 1 | 81 | 0.49 | 1.27 | 5.8 | none |
| 7* | 0 | PE 1 | 100 | 0.43 | 1.41 | 5.4 | none |
| 8* | 0 | PE 1 | 100 | 0.43 | 0.92 | 5.3 | none |
| 9 | 76 | PE 2 | 24 | 4.1 | 0.96 | 18 | none |
| 10 | 76 | PE 2 | 24 | 3.2 | 1.38 | 16 | none |
| 11 | 47.5 | PE 2 | 52.5 | 2 | 1.2 | 7.6 | none |
| 12 | 47.5 | PE 2 | 52.5 | 2.8 | 0.84 | 8.3 | none |
| 13 | 19 | PE 2 | 81 | 1.5 | 0.91 | 6.2 | none |
| 14 | 19 | PE 2 | 81 | 1.1 | 1.33 | 6.3 | none |
| 15 | 0 | PE 2 | 100 | 1 | 1.4 | 6.4 | none |
| 16 | 0 | PE 2 | 100 | 1.21 | 0.91 | 6.4 | none |
| 17* | 100 | | 0 | 6.9 | 0.67 | 48 | massed |
| 18 | 76 | PE 3 | 25 | 4.7 | 1.03 | 89 | breakable |
| 19 | 76 | PE 3 | 24 | 3.2 | 1.26 | 61 | breakable |
| 20 | 47.5 | PE 3 | 52.5 | 2.5 | 1.05 | 40 | none |
| 21 | 19 | PE 3 | 81 | 3.8 | 0.89 | 31 | none |
| 23 | 19 | PE 3 | 81 | 2.3 | 1.17 | 28 | none |
| 24* | 0 | | 100 | 2.4 | 1.24 | 30 | none |
| 25* | 0 | | 100 | 3.6 | 0.91 | 34 | none |
| 26 | 85.5 | PE 3 | 14.5 | 5.6 | 1.08 | 82 | massed, breakable |
| 27 | 90 | PE 3 | 10 | 9.1 | 0.84 | 109 | massed |
| 28* | 95 | | 5 | 5.8 | 1.13 | 47 | massed, breakable |

*= comparative

The massing tendencies were evaluated by subjecting the polymer under a pressure of 100 g/sq. cm at 50° C. for a period of 24 hr. The pressure is similar to the one experienced by the bottom layer of a 1 ton pallet of resins. At the end of the period, the polymer was inspected to see if the pellets have massed together and if so, whether the mass can be broken up.

In the dry flow experiment, 250 g of the resin was allowed to pass through a stemmed plastic funnel (diameter of the Stern is about 2 cm). The time it took for the resin to pass through was recorded This time is dependent on the shape of the pellets, but since all the samples are produced under similar conditions, their shapes are similar. The relative dry flow time is therefore a good indication of how easy the resin can be handled.

The above examples demonstrate that the presence of the PE in the systems helps minimize the massing tendencies of the co-grafts and improves their dry flow characteristics. In the absence of any PE, the product massed badly and had a very slow Dry flow (Ex. 17) The presence of small amount of PE (5%, Ex. 28) still resulted in massing. Addition of 22 or more % of a LLDPE (PE 2, 0.920 density) or HDPE (PE 1, 0.956 density) rendered the product non-massing and with good dry flow properties. However, the addition of up to 24% of a VLDPE (PE 3, 0.885 density) did not make the product non-massing, although the mass was easily breakable. With this lower density PE, addition of up to 52% is required to make it truly non-massing.

The toughening characteristics of the polymer mix depends on the density of the PE. The higher the density of the PE, the smaller amount of PE is tolerable in the blend.

It may be seen by inspection from the table that lower PE density produces better results. PE 1 gave supertough impact only when it was less than 20% of the recipe. PE 2 gives supertough results at 23° C., but many of the 0° C. breaks were brittle. PE 3 gave uniformly ductile breaks.

The toughening characteristics also depend upon the graft level of the modified Polymer blend. Higher graft level is required when the PE density is higher.

The following examples demonstrate the effectiveness of adding an ethylene-α-olefin having at least 4 carbon atoms copolymer (including terpolymers) with a density range of 0.880 to 0.930 g/cc and an MI (190° C., 2.16 Kg) of between 0.01 to 50 dg/min in a percentage of >10% to a metallocene produced polymer having a tendency to mass. The results clearly show the non-massing characteristics of the resulting co-grafted product. The co-grafted compositions are effective as tougheners in polyamide compositions wherein said co-graft is present in a percentage of 3–89% of the co-graft/polyamide blend.

Example 29

20% Ethylene/butene/octene terpolymer (density 0.91 g/cc, 1.9 MI) and 80% of metallocene ethylene octene polymer (density 0.857 g/cc, 1 MI) were co-grafted together with maleic anhydride in a 43 mm Berstorff co-rotating twin extruder in the presence of 300 ppm Lupersol 101 at 260° C. The co-graft had an MA level of 0.55% and an MI of 2.2 dg/min.

Example 30

The same procedure described in 29 above was used except that 40% of the PE terpolymer was used instead of 20%. The co-graft had a graft level of 0.45% and an MI of 1.7 dg/min.

Comparative Example (metallocenes)

Ethylene/octene copolymer—(density 0.857 g/cc, 1 MI) was grafted with maleic anhydride in a 43 mm Berstorff co-rotating twin extruder in the presence of 300 ppm of Lupersol 101 at 260° C. The product was pelletized using a Gala underwater pelletizer and collected in a paper bag. It had a 0.59% maleic anhydride incorporation and an MI of 2.4.

Comparative Example (metallocene) exhibited massing characteristics overnight while Example 29 and 30 did not mass.

Example 31

A blend of an ethylene/butene/octene terpolymer (0.910 density, 1.9 MI) and a copolymer of ethylene/butene (0.863 g/cc, 0.5 MI) at a ratio of 80 to 20 by weight was grafted with maleic anhydride in a process similar to Example 30 above. The product had a graft level of 0.9% and an MI of 2 dg/min and was non-massing.

This example demonstrates that even high levels of an ethylene-α-olefin having at least 4 carbon atoms copolymers (including terpolymers) when co-grafted with a metallocene ethylene octene substantially linear polymer with a density of 0.863 g/cc and an MI of 2 dg/min provides a non-massing co-graft. This co-graft was then blended with a polyamide and provided good toughening characteristics.

Examples 32–63 below demonstrate the preparation of a non-massing co-graft followed by addition of a co-graft to a polyamide to form a toughened composition.

Example 32

A mixture of 47.5% NORDEL® 3681, 47.5% PE ( 0.905 density, 0.8MI, Attane 4403) and 5% of peroxide concentrate (5500 ppm of Lupersol 101 in a VLDPE) was grafted with 2% maleic anhydride in a co-rotating twin screw extruder at 310° C. NORDEL® 3681 is an EPDM available commercially from DuPont/Dow Elastomers Co., Wilmington, Del. Attane 4403 is a Dow Chemical Company's Ultra Low Density Ethylene Octene Copolymer. Lupersol 101 is 2,5-dimethyl 2,5di(t-butylperoxy)hexane, a registration trade mark of Elf Ato Chem. The product has a MI of 0.9 dg/min. at 1 90° C. and a graft level of 1.46%.

The product described and the other co-grafts prepared were melt blended together with nylon 6,6 (available commercially from E. I. du Pont de Nemours and Company, Wilmington, DE as ZYTEL®& 101), and NORDEL® 3681 using 16.1 lbs. polyamide, 3.9 lbs. co-graft and 9.1 g aluminum disteareate. During the operation for melt blending of the toughener with the polyamide, the ingredients were first dry blended by tumbling in a drum. The mixture was then compounded by melt blending in a 30 mm Werner & Pfleirerer co-rotating twin screw extruder with a barrel temperature of between 230° C. and 260° C. and a die temperature of 290° C. Extrusion was carried out with a port open to the air or under vacuum. The screw speed was 360 rpm and the extruder feed rate was 56+pounds per hour. The resulting strand was quenched in water, cut into pellets, and sparged with nitrogen until cool. The moisture in the resulting pellets was adjusted to between 0.1% and 0.2% by drying or adding additional water as required. Test bars (½x2.5x⅛ inch) were molded in an injection molding machine. The molded bars were tested using the Notched Izod testing procedure ASTM D-256-73 in their dry-as-molded state.

The following examples were prepared as above and Table 2 shows the results

TABLE 2

| Example (Toughened Composition) | Co-graft | % MA | PE Type | PE Den | % PE. | % EPR | % PO | NI 0 | NI 23 |
|---|---|---|---|---|---|---|---|---|---|
| 33 | 28 | 1.13 | NONE |  | 0 | 95 |  | 13.95 | 17.05 |
| 34 | 27 | 0.84 | PE 3 | 0.885 | 10 | 90 | 0 | 13.94 | 15.49 |
| 35 | 26 | 1.08 | PE 3 | 0.885 | 9.5 | 85.5 | 5 | 15.12 | 18.34 |
| 36 | 25 | 0.91 | PE 3 | 0.885 | 95 | 0 | 5 | 11.32 | 16.84 |
| 37 | 24 | 1.24 | PE 3 | 0.885 | 95 | 0 | 5 | 14.46 | 18.89 |
| 38 | 23 | 1.17 | PE 3 | 0.885 | 76 | 19 | 5 | 14.81 | 18.66 |
| 39 | 22 | 0.89 | PE 3 | 0.885 | 76 | 19 | 5 | 12.92 | 17.09 |
| 40 | 21 | 0.82 | PE 3 | 0.885 | 47.5 | 47.5 | 5 | 15 | 17.93 |

TABLE 2-continued

| Example (Toughened Composition) | Co-graft | % MA | PE Type | PE Den | % PE. | % EPR | % PO | NI 0 | NI 23 |
|---|---|---|---|---|---|---|---|---|---|
| 41 | 20 | 1.05 | PE 3 | 0.885 | 47.5 | 47.5 | 5 | 14.25 | 18.32 |
| 42 | 19 | 1.26 | PE 3 | 0.885 | 19 | 76 | 5 | 16.14 | 19.11 |
| 43 | 18 | 1.03 | PE 3 | 0.885 | 19 | 76 | 5 | 16.32 | 18.47 |
| 44 | 17 | 0.67 | NONE |  | 0 | 100 | 0 | 14.66 | 15.05 |
| 45 | 16 | 0.91 | PE 2 | 0.92 | 95 | 0 | 5 | 3.53 | 4.65 |
| 46 | 15 | 1.4 | PE 2 | 0.92 | 95 | 0 | 5 | 4.55 | 15.87 |
| 47 | 14 | 1.33 | PE 2 | 0.92 | 76 | 19 | 5 | 5 | 16.15 |
| 48 | 13 | 0.91 | PE 2 | 0.92 | 76 | 19 | 5 | 3.59 | 12.23 |
| 49 | 12 | 0.84 | PE 2 | 0.92 | 47.5 | 47.5 | 5 | 5.68 | 15.46 |
| 50 | 11 | 1.2 | PE 2 | 0.92 | 47.5 | 47.5 | 5 | 8.99 | 17.5 |
| 51 | 10 | 1.38 | PE 2 | 0.92 | 19 | 76 | 5 | 16.19 | 18.87 |
| 52 | 9 | 0.96 | PE 2 | 0.92 | 19 | 76 | 5 | 14.84 | 19.25 |
| 53 | 8 | 0.92 | PE 1 | 0.956 | 95 | 0 | 5 | 2.54 | 2.74 |
| 54 | 7 | 1.41 | PE 1 | 0.956 | 95 | 0 | 5 | 3.14 | 3.37 |
| 55 | 6 | 1.27 | PE 1 | 0.956 | 76 | 19 | 5 | 3.28 | 3.6 |
| 56 | 5 | 0.82 | PE 1 | 0.956 | 76 | 19 | 5 | 2.42 | 2.7 |
| 57 | 4 | 0.89 | PE 1 | 0.956 | 47.5 | 47.5 | 5 | 3.46 | 4.19 |
| 58 | 3 | 1 | PE 1 | 0.956 | 47.5 | 47.5 | 5 | 3.87 | 4.82 |
| 59 | 2 | 1.2 | PE 1 | 0.956 | 19 | 76 | 5 | 7.25 | 17.59 |
| 60 | 1 | 0.92 | PE 1 | 0.956 | 19.5 | 78 | 2.5 | 5.89 | 16.51 |

In addition to the examples prepared above, the toughened polyamide compositions were also diluted with EPDM to determine the effect. Table 3 shows the relative ingredient ratios and the NI resulting using NI test ASTM D-256-73. The NI of the resulting blends are summarized as follows:

TABLE 3

| Example (Toughened Composition) | Nylon 6,6 | modified (EPDM/ PE) | EPDM | NI@23° C. | NI@0° C. |
|---|---|---|---|---|---|
| 61 | 80.5% | 13% | 6.5% | 18.94 | 14.1 |
| 62 | 80.5% | 11.7% | 7.8% | 18.25 | 14.0 |
| 63 | 80.5% | 9% | 10.5% | 16.69 | 6.72 |

The results indicate that good room temperature and low temperature Notched Izod values are obtained even when the graft source is diluted with EPDM. (EPDM/PE)-g-MA and PE together as a toughener blend may also be utilized according to the method described herein.

In addition to the advantages described heretofore, the co-grafted polymers have enhanced melt-cutting properties, better ease of handling and enhanced pelletization properties.

What is claimed is:

1. A polymeric toughening agent useful for improving the impact properties of polymeric compositions, comprising,
   (a) a copolymer of ethylene with one or more α-olefins having at least 4 carbon atoms and having a density of 0.930 to 0.880 g/cc and a melt index (MI) of 0.01 to 50 dg/min at 190° C., 2.16 Kg;
   (b) a massing polymer selected from a copolymer of ethylene with one or more α-olefins having at least 3 carbon atoms and having a density of 0.850 to 0.880 g/cc and an MI of 0.01 to 50 dg/min at 190° C., 2.16 Kg wherein the ratio of (a) to (b) is 10:90–90:10; and
   (c) 0.9–5 wt % relative to (a) and (b) of a grafted monomer covalently bonded to (a) and (b) selected from an olefinic carboxylic acid or anhydride or derivative thereof.

2. The polymeric toughening agent of claim 1 wherein component (a) has a density of 0.890 to 0.920 g/cc and an MI of 0.1 to 10 dg/min and component (b) has a density of 0.855 to 0.875 g/cc and an MI of 0.1 to 10 dg/min.

3. The polymeric toughening agent of claim 1 wherein component (a) has a density of 0.890 to 0.920 g/cc and an MI of 0.1 to 10 dg/min and component (b) has a density of 0.855 to 0.875 g/cc and an MI of 0.1 to 10 dg/min and wherein component (c) is 0.1 to 3 wt % relative to (a) and (b).

4. The polymeric toughening agent of claim 1 wherein component (a) has a density of 0.90 to 0.910 g/cc and an MI of 0.5 to 5 dg/min and component (b) has a density of 0.86 to 0.87 g/cc and an MI of 0.4 to 2 dg/min.

5. The polymeric toughening agent of claim 1 wherein component (a) has a density of 0.90 to 0.910 g/cc and an MI of 0.5 to 5 dg/min and component (b) has a density of 0.86 to 0.87 g/cc and an MI of 0.2 to 2 dg/min and wherein component (c) is 0.9 to 2 wt % relative to (a) and (b).

6. The polymeric toughening agent of claim 1 wherein component (a) is selected from a linear low density polyethylene and component (b) is selected from an ethylene/propylene/diene monomer, ethylene/propylene rubber; a metallocene polyethylene having a melt flow ratio $I_{10}/I_2$ of less than 6.53 and an $M_w/M_n$ ratio of greater than the melt flow less 4.63; a metallocene polyethylene having a melt flow ratio $I_{10}/I_2$ of less than 6.13 and an $M_w/M_n$ ratio of equal or less than the melt flow ratio less 4.63 and component (c) is selected from the group consisting of acrylic acid, methacrylic acid, fumaric acid, maleic acid, nadic acid, citaconic acid, itaconic acid and anhydrides, metal salts, esters, amides or imides of said salts.

7. The polymeric toughening agent of claim 6 wherein the toughening agent is non-massing.

8. A polymeric composition having improved impact properties, comprising:
   (1) a polymeric toughening agent useful for improving the impact properties of the polymeric composition, comprising,
      (a) a copolymer of ethylene with one or more α-olefins having at least 4 carbon atoms and having a density of 0.930 to 0.880 g/cc and an MI of 0.01 to 50 dg/min at 190° C., 2.16 Kg;
      (b) a massing polymer selected from a copolymer of ethylene with one or more α-olefins having at least 3 carbon atoms and having a density of 0.850 to 0.880 g/cc and an MI of 0.01 to 50 dg/min at 190° C., 2.16 Kg wherein the ratio of (a) to (b) is 10:90–90:10; and (c) 0.9–5 wt % relative to (a) and (b) of a grafted monomer covalently bonded to (a) and (b) selected from an olefinic carboxylic acid or anhydride or derivative thereof; and (2) an olefinic or non-olefinic material.

9. The polymeric composition of claim 8 wherein the non-olefinic material is selected from a polyamide and wherein the weight percentage ratio of (1):(2) is 3–40:97–60.

10. The polymeric composition of claim 9 wherein the polyamide is selected from nylon 6 or nylon 6,6 and wherein the weight percentage ratio of (1):(2) is 15–25:85–75.

11. A process for producing a polymeric composition having improved impact properties, comprising, (a) preparing a polymeric toughening agent useful for improving the impact properties of the polymeric composition as claimed in claim 1, by:

(1) feeding both a massing polymer and an ethylene-α-olefin at a ratio of 10–90 wt % ethylene-α-olefin to massing polymer into the feed throat of a twin screw extruder at a barrel temperature of 150–400° C.;

(2) optionally introducing a free radical initiator and introducing an olefinic carboxylic acid or anhydride or derivative thereof into the extruder to form the polymeric toughening agent;

(3) removing excess unreacted olefinic carboxylic acid or anhydride and isolating the polymeric toughening agent; and (b) melt-blending the polymeric toughening agent produced in step (a) with a polyamide or another non-olefinic or olefinic material in an extruder, internal mixer or rubber mill at a temperature sufficient to melt the blend to form the polymeric composition.

12. The process according to claim 11 wherein a partitioning agent is not required to eliminate or diminish massing of the massing polymer.

13. The process of claim 11 wherein the olefinic carboxylic acid or anhydride is maleic anhydride and the polyamide is selected from nylon 6,6 or nylon 6.

14. Fabricated articles made from the polymeric composition of any one of claim 8 or 9.

* * * * *

UNITED STATES PATENT AND TRADEMARK OFFICE
Certificate

Patent No. 6,331,592 B1                                     Patented: December 18, 2001

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Chun Sing Wong, Kingston (CA); and Robert Benham Fish, Jr., Parkersburg, WV (US).

Signed and Sealed this First Day of August 2006.

*JAMES J. SEIDLECK*
*Supervisory Patent Examiner*
Art Unit 1711